United States Patent
Ozdemir et al.

(10) Patent No.: US 12,072,881 B2
(45) Date of Patent: Aug. 27, 2024

(54) KEY RANGE QUERY OPTIMIZATION

(71) Applicant: Salesforce, Inc., San Francisco, CA (US)

(72) Inventors: Kadir Ozdemir, San Jose, CA (US); Tanuj Khurana, Kirkland, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/151,280

(22) Filed: Jan. 6, 2023

(65) Prior Publication Data

US 2024/0232194 A1  Jul. 11, 2024

(51) Int. Cl.
*G06F 16/24* (2019.01)
*G06F 16/242* (2019.01)
*G06F 16/245* (2019.01)
*G06F 16/2453* (2019.01)

(52) U.S. Cl.
CPC .... *G06F 16/24542* (2019.01); *G06F 16/2445* (2019.01)

(58) Field of Classification Search
None
See application file for complete search history.

(56) References Cited

U.S. PATENT DOCUMENTS

| | | | |
|---|---|---|---|
| 7,529,728 B2 | 5/2009 | Weissman et al. | |
| 8,635,206 B2 | 1/2014 | Barbas | |
| 2005/0071827 A1* | 3/2005 | Lai | G06F 16/245 |
| 2016/0275094 A1* | 9/2016 | Lipcon | G06F 16/278 |
| 2016/0299947 A1* | 10/2016 | Pangeni | G06F 16/24537 |
| 2017/0097954 A1* | 4/2017 | Moriyama | G06F 16/2379 |
| 2020/0364227 A1* | 11/2020 | Mathew | G06F 16/2453 |
| 2023/0004579 A1* | 1/2023 | Trinh | G06F 16/285 |

* cited by examiner

*Primary Examiner* — Son T Hoang
(74) *Attorney, Agent, or Firm* — Kowert, Hood, Munyon, Rankin & Goetzel, P.C.; Mark D. Seegers; Dean M. Munyon

(57) ABSTRACT

A computer system receives a database query to be executed against a database having a database table that stores records associated with keys. The database query specifies a set of conditional expressions that affect which ones of those records are returned. Based on the set of conditional expressions, the computer system derives a set of key ranges. The deriving can include representing the set of conditional expressions as a set of key spaces, performing a set of logical operations on pairs of those key spaces to reduce a number of key spaces in the set of key spaces, and converting the set of key spaces into the set of key ranges after performing the set of logical operations.

18 Claims, 10 Drawing Sheets

```
                    Conditional
                  ╱ Expression 240A
         (PK1, PK2)>(A, B)
                │ Convert
                ▼
     (PK1>A) OR (PK1=A AND PK2>B)
                    ╲ AND/OR
                      Expression 310A
─────────────────────────────────
                  ╱ 240B
         PK3 BETWEEN A AND B
                │ Convert
                ▼
         (PK3≥A) AND (PK3≤B)
                    ╲ 310B
─────────────────────────────────
                  ╱ 240C
            PK4 IN (A, B, C)
                │ Convert
                ▼
     (PK4=A) OR (PK4=B) OR (PK4=C)
                    ╲ 310C
```

KEY RANGE QUERY OPTIMIZATION

BACKGROUND

Technical Field

This disclosure relates generally to computer systems and, more specifically, to various mechanisms for deriving key ranges for a database statement/query.

Description of the Related Art

Modern systems routinely enable users to store a collection of information as a database that is organized in a manner that can be efficiently accessed and manipulated. Those systems often store at least a portion of that information in database tables that are composed of columns and rows in which each column defines a grouping of that information. During its operation, a system can receive requests from applications or other systems to execute database transactions on the information stored in a database managed by that system. Those transactions can involve various database statements, such as SQL SELECT statements, SQL UPDATE statements, and SQL INSERT statements. Those database statements can also include additional clauses, such as a WHERE clause, that affect the data that is operated on during the execution of the database statements.

DETAILED DESCRIPTION

Figure 1:
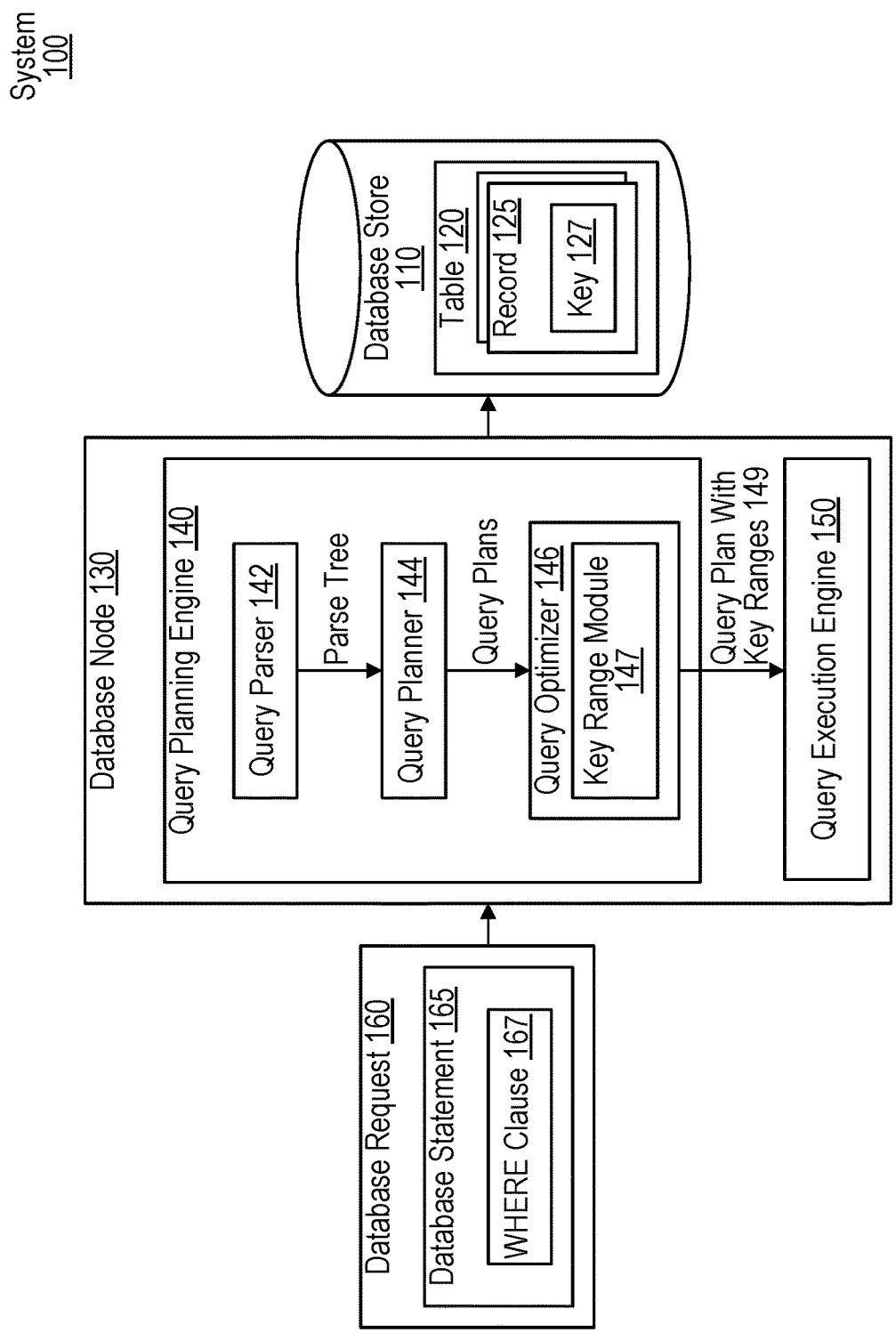
FIG. 1 is a block diagram that illustrates example elements of a system having a database store and a database node that can derive a set of key ranges for a database statement, according to some embodiments.

A system that implements a database often stores data in database tables in which rows correspond to records. A record can be accessed from a database table using a primary key that uniquely identifies the record from the other records of the database table. The primary key for that record is derived from values of the record that correspond to one or more columns of the database table that have been designated primary key columns. Consider an example in which a database table includes a company ID column and a user ID column that have been designated primary key columns. The primary key for a given record in that database table is derived from a combination of the company ID and the user ID that the record stores for those columns. The records/rows in a database table are typically sorted by their primary key to enable a system to quickly and efficiently access those records. A database statement (alternatively, referred to as a database query) can include a WHERE clause that specifies one or more conditions that affect which records of a database table are returned when the database statement is executed. If those conditions involve primary key columns (e.g., company ID=101), then a query optimizer can derive primary key ranges to be scanned when the database statement is executed. For example, a database table might store records for thousands of companies. If a database statement has a WHERE clause that specifies "company ID=101," then the query optimizer can derive a key range that encompasses only the records of that particular company. Such an optimization can improve a database query's performance as many rows of a database table can be skipped when the system is searching for records that satisfy the conditions of the WHERE clause.

But a primary key can be composed of several primary key columns. If restrictions are not imposed, then a WHERE clause involving multiple primary key columns can lead to a "key range explosion" that results in a large number of key ranges. Consider an example in which a primary key is a combination of three integer columns: PK1, PK2, and PK3. A WHERE clause specifying PK1>100 AND PK2<15 will result in the key ranges (101, −2147483648) to (101, 14), (102, −2147483648) to (102, 14), . . . , and (2147483648, −2147483648) to (2147483648, 14). (A key range (X, Y) to (Z, A) can be denoted using the notation [(X, Y), (Z, A)] where (X, Y) and (Z, A) are the boundary keys for the key range.) As can be seen from this example, there are WHERE clauses that result in the generation of a very large number of key ranges—this scenario is referred to as a key range explosion. Attempting to optimize a database query by deriving the key ranges that are involved in executing that query can lead to excessive memory allocation and long computation times when there is a key range explosion. In many cases, when there is a key range explosion, the resources consumed in deriving the key ranges as a part of the query optimization is greater than the resources that are saved by that query optimization. This result renders the optimization worthless. This disclosure addresses, among other things, the problem of how to efficiently derive key ranges in view of the possibility of a key range explosion.

In various embodiments described below, a computer system includes a database store and a database node that can access records of database tables stored at the database store. The database node may receive a request to perform a database transaction that involves executing a database statement in relation to a certain database table. The database statement may specify one or more conditional expressions (e.g., value <45) that affect which records of that database table are returned and/or manipulated by that database statement. In various embodiments, the database node converts the conditional expressions into equivalent AND/OR expressions that include key spaces. Once those conditional expressions have been converted, then the database node performs the AND and/or OR operations of the AND/OR expressions on pairs of the key spaces. For an AND operation, in various embodiments, the intersection of a key space pair is taken and results in a single key space or an empty key space. For an OR operation, in various embodiments, the union of a key space pair is taken and results in the original key spaces or a single key space. All the AND and OR operations may be performed to produce a resulting set of key spaces. After performing the operations, the database node converts the resulting set of key spaces into a set of key ranges and executes the database statement based on the set of key ranges.

Before converting the key spaces to the key ranges or during that conversion process, in various embodiments, the database node can detect that converting a certain key space into key ranges will result in a key range explosion. Consequently, the database node may drop one or more of the primary key columns that are used to construct the primary key. As an example, if the database statement uses key columns PK1, PK2, and PK3 in its conditional expressions, then the database node may drop PK3 and thus drop a component of the key spaces that maps to PK3. The database node then attempts to convert the lower-dimensional key space into key ranges, but if it detects another potential key range explosion, then the database node may drop another key column involved in the database statement and attempt the conversion again until a set of key ranges is derived without a key range explosion. In various embodiments, the key range explosion is defined such that no more than a threshold number of resources are used to produce the set of key ranges.

These techniques may be advantageous over prior approaches as these techniques allow key ranges to be derived for a database statement as part of a query optimization process while also providing a mechanism to detect key range explosions. By detecting key range explosions and then dropping the number of key columns used, a system is able to generate key ranges in an efficient manner as using fewer key columns lowers the change of key range explosions but at the cost of less precise key ranges. That is, by converting the conditional expressions into a set of AND/OR expressions having key spaces and using mechanisms to detect and then avoid key range explosions, a system can generate key ranges while avoiding the excessive memory allocation and long computation times that can result from key range explosions. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software. In the illustrated embodiment, system 100 includes a database store 110, a database node 130, and a database request 160. Also as shown, database store 110 includes a table 120 storing records 125 having keys 127, database node 130 includes a query planning engine 140 and a query execution engine 150, and database request 160 includes a database statement 165 having a WHERE clause 167. As further shown, query planning engine 140 includes a query parser 142, a query planner 144, and a query optimizer 146 that comprises a key range module 147. The illustrated embodiment may be implemented differently than shown. As an example, there may be multiple database nodes 130 that interact with database store 110.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using a cloud infrastructure provided by a cloud provider. Thus, database store 110 and/or database node 130 may execute on and utilize the available cloud resources of that cloud infrastructure (e.g., computing resources, storage resources, network resources, etc.) to facilitate their operation. For example, program code executable to implement database node 130 may be stored on a non-transitory computer-readable medium of server-based hardware included in a datacenter of the cloud provider and executed in a virtual machine that is hosted on that server-based hardware. In some cases, database node 130 may execute on a computing system of the cloud infrastructure without the assistance of a virtual machine or other particular technologies, such as containerization. In some embodiments, system 100 is implemented on local or private infrastructure as opposed to a public cloud.

Database store 110, in various embodiments, stores a collection of information that is organized in a manner that allows access and manipulation of that information. Database store 110 may include supporting software (e.g., storage servers) that enables database node 130 to carry out operations (e.g., accessing, storing, etc.) on the information that is stored at database store 110. For example, database store 110 might be implemented using Apache HBase™. In various embodiments, database store 110 utilizes a single or multiple storage devices that are connected together on a network (e.g., a storage attached network (SAN)) and configured to redundantly store information in order to prevent data loss. The storage devices may store data persistently and thus database store 110 can serve as a persistent storage for system 100. Also, in some embodiments, data written to database store 110 by database node 130 is accessible to other database nodes 130 in a multi-node configuration. In various embodiments, data is stored at database store 110 in records 125 associated with database tables, such as table 120.

Table 120, in various embodiments, is a database object having a set of records 125—that set of records 125 may be an empty set. Table 120 may store data in an organized structure that comprises columns and rows, where a column defines a field and a row corresponds to a record 125 that includes one or more values for the columns. A field, in various embodiments, provides structure for table 120 and defines a category of data for which rows of table 120 may provide a value. As an example, a field might correspond to usernames and thus a row (i.e., a record 125) of table 120 may include a username value for that field. A record 125, in various embodiments, is a key-value pair comprising data and a key 127 usable to look up that record 125. A key 127 may be a primary key that is composed of the values of one or more fields of table 120 and uniquely identifies its associated record 125. A key 127 may be considered as a tuple of values (an ordered set of values) of its key fields. In various embodiments, the records 125 (the rows) of table 120 are sorted by key 127. Table 120 might also store data for multiple users/tenants. Accordingly, table 120 can include a field that defines tenant as a subset of data under which each record 125 identifies a tenant. While database tables are discussed, in some embodiments, other types of database objects may be used, such as a document object in a non-relational database.

Database node 130, in various embodiments, provides database services, such as data storage, data retrieval, and/or data manipulation. In various embodiments, database node 130 is software that is executable on hardware, while in some embodiments, it encompasses both the hardware and the software. The database services may be provided to other components in system 100 or to components external to system 100. As shown, database node 130 can receive database request 160 to perform a database transaction involving a set of database statements 165—database request 160 might be received from an application node (not illustrated) via an established database connection. A database transaction, in various embodiments, is a logical unit of work (e.g., a set of database statements 165) to be executed in relation to database store 110. A database statement 165 may be a SQL statement that comprises various clauses, such as SELECT, UPDATE, INSERT, DELETE, FROM, WHERE, etc. As an example, processing a database transaction may include executing a SQL SELECT statement to select and return one or more rows from one or more tables 120. The contents of a row are specified in a record 125 and thus database node 130 may return one or more records 125 that correspond to the one or more rows. Those one or more records 125 may be returned in a transaction response to the issuer of the corresponding database request 160.

In the illustrated embodiment, database statement 165 includes WHERE clause 167—the other clauses (e.g., a SELECT clause, a FROM clause, etc.) that can be included in database statement 165 are not depicted. WHERE clause 167, in various embodiments, is used to specify one or more conditional expressions that identify the records 125 that are affected by database statement 165. The set of conditional expressions can be joined by ANDs, ORs, and/or NOTs, and are based on one or more fields of table 120. As an example, database statement 165 might specify SELECT*FROM table 120 WHERE age <45 AND city=Austin. Consequently, in this example, records 125 of table 120 are returned to the requestor if those records 125 include an age value <45 and a city value=Austin. Another example WHERE clause 167 is discussed in detail with respect to FIG. 2B. In order to execute database statement 165, database node 130 may generate different query execution plans for database statement 165.

Query planning engine 140, in various embodiments, is software executable to generate a query plan (also referred to as a query execution plan) for database statement 165. Since SQL is declarative, there are typically various alternative ways to execute database statement 165, each with varying performance. Accordingly, a query plan is a sequence of steps corresponding to one of the possible ways to execute database statement 165. To generate a given query plan, database statement 165 may initially be provided as input into query parser 142. Query parser 142, in various embodiments, is software executable to parse database statement 165 and then generate a parse tree based on the parsing. In particular, query parser 142 separates the pieces of database statement 165 into a data structure (e.g., a parse tree) processable by other routines of query planning engine 140. As a part of the parsing process, query parser 142 may perform checks, such as a syntax check that checks whether database statement 165 breaks a particular database rule, a semantic check that checks whether the objects specified in database statement 165 exist, etc. The parse tree is then provided as input into query planner 144. Query planner 144, in various embodiments, is software executable to generate one or more query plans based on the input (e.g., a parse tree) from query parser 142. Many modern database applications, such as MongoDB®, include their own query planner routine. After a set of query plans have been generated by query planner 144, the set of query plans or a selected query plan is passed to query optimizer 146.

Query optimizer 146, in various embodiments, is software that is executable to attempt to optimize a set of query plans and then select one of those plans that is believed to be the best (according to specified criteria). One type of optimization is key range derivation. In particular, table 120 may be divided into table regions (e.g., horizontally sliced portions of table 120) that are assigned to one or more database nodes 130 of a node cluster. Within a given table region, there can be a considerably large number of rows that are sorted based on their key 127. When processing database statement 165, it may be desirable to derive key ranges 149 so that system 100 can identify which table regions to visit and which rows within the table region to consider. By deriving key ranges 149, query optimizer 146 can prevent system 100 from having to search every table region and row for records 125 that satisfy database statement 165.

Key range module 147, in various embodiments, is software that is executable to derive key ranges 149 from database statement 165. To derive key ranges 149 for database statement 165, in various embodiments, key range module 147 first converts the conditional expressions of WHERE clause 167 into equivalent AND/OR expressions. Examples of this conversion are discussed in greater detail with respect to FIG. 3. Key range module 147 can further represent the conditional expressions using key spaces as a part of the AND/OR expressions. An example of a key space is discussed in greater detail with respect to FIGS. 4A-B. Thereafter, in various embodiments, key range module 147 performs AND and/or OR operations on pairs of the key spaces to generate a resulting set of key spaces. An example AND operation is discussed with respect to FIG. 5A while an example OR operation is discussed with respect to FIG. 5B. Key range module 147 may then convert the resulting set of key spaces into one or more key ranges 149. An example of converting the set of key spaces into key ranges 149 is discussed in greater detail with respect to FIG. 6B. After deriving those key ranges 149, query planning engine 140 can send a query plan that utilizes them to query execution engine 150.

Query execution engine 150, in various embodiments, is software that is executable to execute database statement 165 according to a query plan. When processing a query plan that utilizes derived key ranges 149, in various embodiments, query execution engine 150 searches only those records 125 whose key 127 falls within the key ranges 149. By searching only within the key ranges 149, query execution engine 150 can preserve system resources and reduce the query's execution time. After processing database statement 165, query execution engine 150 may return one or more records 125 to the issuer of database request 160.

Figures 2A, 2B:
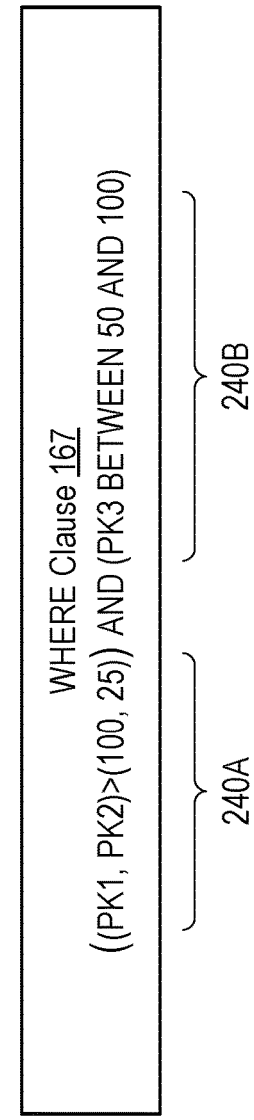
FIG. 2A is a block diagram that illustrates an example database table and database key, according to some embodiments.
FIG. 2B is a block diagram that illustrates an example WHERE clause that comprises a set of conditional expressions, according to some embodiments.

Turning now to FIG. 2A, a block diagram of an example table 120 and key 127 is shown. In the illustrated embodiment, table 120 comprises columns 210A-E and a set of rows 220, and key 127 comprises key components 230A-C. The illustrated embodiment may be implemented differently than shown. For example, key 127 may comprise only one key component 230 that corresponds to a single column.

Column 210, in various embodiments, is a field that defines a category of data for which rows 220 provide a value. For example, in the illustrated embodiment, column 210A can be a company ID field, column 210B can be a subdivision ID field, column 210C can be a user ID field, column 210D can be a name field, and column 210E can be a city field. Accordingly, as shown, rows 220 (their underlying records 125) store values for those columns 210. In various embodiments, rows 220 can be sorted (e.g., in ascending or descending order) based on one or more columns 210 of table 120. In particular, one or more columns 210 may be selected to use as primary key columns whose values are used to uniquely identify a row 220. The one or more columns 210 together are used to form key 127.

As shown, key 127 includes key components 230A-C corresponding to columns 210A-C, respectively. Key components 230A-C are an ordered composition of columns 210A-C. For example, the key 127 for the first row 220 is (1000, 1, 62)—the values of the first row 220 for columns 210A-C may be concatenated according to their order to form that row's key 127 (i.e., 1000162). As shown, table 120 is alphabetically sorted based on each row's key 127—that is, based on columns 210A-C and according to their ordered composition (i.e., column 210A is the most leading key component 230A while column 210C is the most trailing key component 230C). By sorting table 120 by key 127, record lookups that search for records based on keys 127 can be performed more efficiently than record lookups that search for records using keys that are derived from a different combination of columns 210.

Turning now to FIG. 2B, a block diagram of an example WHERE clause 167 is shown. In the illustrated embodiment, WHERE clause 167 includes conditional expressions 240A and 240B that are connected by a Boolean AND. In various embodiments, a conditional expression 240 identifies a set of conditions that control which rows 220 (or other data objects) are affected by a database statement 165. For example, as illustrated, conditional expression 240A specifies the condition "(PK1, PK2)>(100, 25)," where PK1 and PK2 correspond to different primary key components 230. To satisfy that condition, a row 220 must include an ordered composition of PK1 and PK2 that is greater than (100, 25), such as (100, 26), (101, 1), etc.

Primary key range derivation may be more useful when WHERE clause 167 comprises conditional expressions 240 for primary key columns 210 that can form primary key prefixes. For example, if columns 210A-C are key components 230 of key 127 and the order is columns 210A, 210B, and 210C, then if column 210A is not included in WHERE clause 167, then it is not as beneficial to identify key ranges 149 without the leading column. Furthermore, the most leading key component 230 may provide the biggest optimization benefit with each subsequent key component 230 providing less benefit than the previous one.

Figure 3:
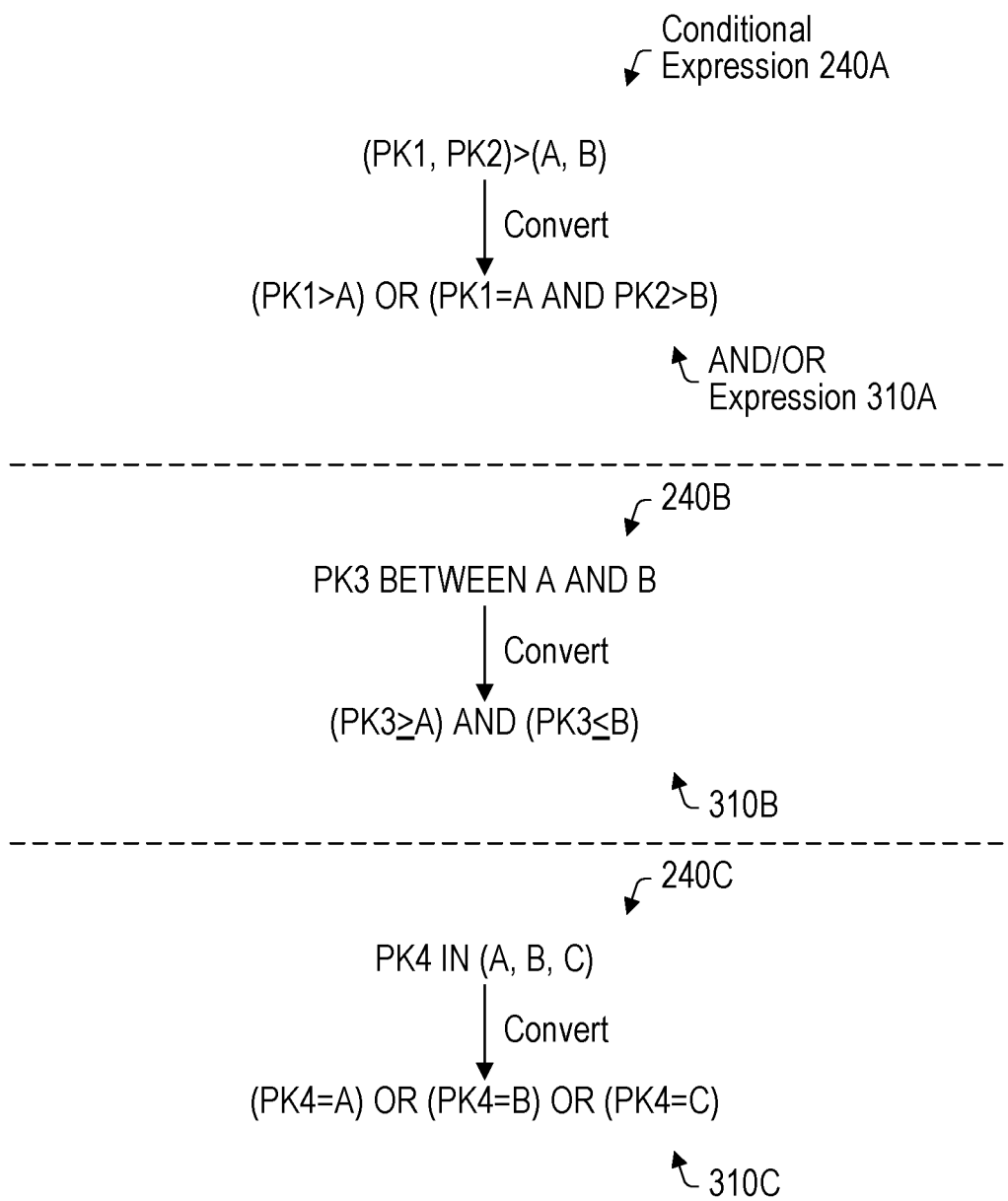
FIG. 3 is a block diagram that illustrates examples of converting conditional expressions into AND/OR expressions, according to some embodiments.

Turning now to FIG. 3, a block diagram of converting conditional expressions 240 into AND/OR expressions 310 is shown. In the illustrated embodiment, there are three conditional expressions 240A-C. As illustrated, conditional expression 240A is a Row Value Constructor condition, conditional expression 240B is a BETWEEN condition, and conditional expression 240C is an IN condition. There can be other conditional expressions 240 than those shown. As an example, a conditional expression 240 may be a LIKE condition that involves a pattern.

As discussed, in various embodiments, key range module 147 initially converts the set of conditional expressions 240 of any arbitrary WHERE clause 167 into AND/OR expressions 310. In respect to conditional expression 240A, the Row Value Constructor (PK1, PK2)>(A, B) means that the values for a key 127 composed of key components 230 "PK1" and "PK2" should greater than the key value constructed from the values "A" and "B" for key components 230 "PK1" and "PK2." Row Value Constructor (PK1, PK2) >(A, B) is equivalent to AND/OR expression 310A (PK1>A) OR (PK1=A AND PK2>B). Consequently, key range module 147 converts conditional expression 240A into AND/OR expression 310A, as shown.

In respect to conditional expression 240B, the condition PK3 BETWEEN A AND B means that the key component 230 "PK3" of key 127 should fall between the values A and B. In some cases, the condition BETWEEN includes A and B in the range, but it might exclude them from the range in other cases. In the illustrated embodiment, the condition BETWEEN is inclusive and thus the condition PK3 BETWEEN A AND B is equivalent to PK3>=A AND PK3<=B—the condition BETWEEN is converted to a single AND operation. Consequently, key range module 147 converts conditional expression 240B into AND/OR expression 310B, as shown.

In respect to conditional expression 240C, the condition PK4 IN (A, B, C) means that the key component 230 "PK4" of key 127 should take the value A, B, or C. Converting an IN condition can involve replacing it with multiple OR operations. As an example, the condition PK4 IN (A, B, C) is equivalent to (PK4=A) OR (PK4=B) OR (PK4=C). Consequently, key range module 147 converts conditional expression 240C into AND/OR expression 310C.

Figure 4A:
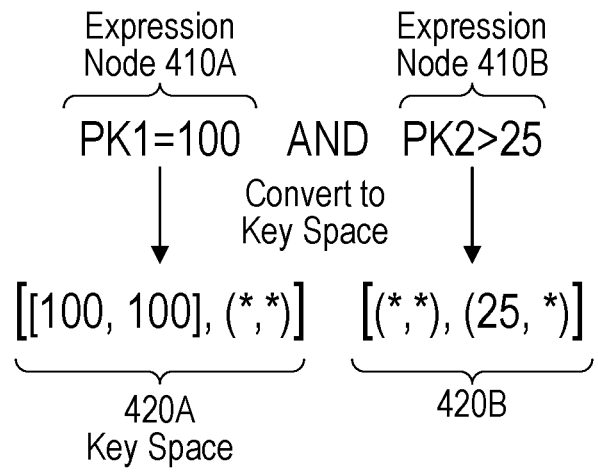
FIGS. 4A-B are block diagrams that illustrate examples of converting expression nodes of an AND/OR expression into key spaces, according to some embodiments.

Turning now to FIG. 4A, a block diagram of converting a set of expression nodes 410 of an AND/OR expression 310 into key spaces 420 is depicted. In the illustrated embodiment, there are two expression nodes: expression node 410A (PK1=100) and expression node 410B (PK2>25). As further shown, there are two key spaces: key space 420A [[100, 100], (*,*)] and key space 420B [(*, *), (25, *)]. The illustrated embodiment might be implemented differently than shown.

An expression node 410, in some embodiments, is a mathematical expression involving a comparison between a set of values. The comparison may be equal to, greater than, less than, etc. For example, as illustrated, PK1=100 is an expression node 410. In various embodiments, key range module 147 represents an expression node 410 as a key space 420. A key space 420, in various embodiments, is an array (i.e., an ordered set) of ranges, each of which corresponds to a dimension in the space. A range can be modeled as a composition of a pair of values: one value for the lower end of the range and one value for the upper end of the range. A range can also be accompanied by a symbol that indicates inclusiveness (e.g., "[") or exclusiveness (e.g., "(") of the values that define that range. For example, an integer range of (5, 8] means that the range includes integer values 6, 7, and 8 but not 5. If an end value is null (represented by "*" in this disclosure), then the corresponding end of the range is unbounded. For example, (5, *) means that the range includes integer values 6, 7, 8, . . . , and 2147483647, where 2147483647 is the highest value of a signed 32-bit integer. A range can be considered as a set of the distinct values in the range.

A dimension of a key space 420 can map to a key component 230 that is used to form keys 127. The range of a dimension is defined by the data type of its associated key component 230—e.g., if the key component 230 is of type INTEGER, then the range can be the range used for signed integers, i.e., [−2147483648, 2147483647]. The number of dimensions in a key space 420 may correspond to the number of key components 230 of a table 120 or a WHERE clause 167. For example, the illustrated embodiment may involve a WHERE clause 167 that includes PK1 and PK2. As such, a key space 420 for that WHERE clause 167 can include two different dimensions: one for PK1 and one for PK2. The entire key space 420 of a table 120 with N key components 230 is an N-dimensional space.

As illustrated, expression node 410A PK1=100 converts to key space 420A [[100, 100], (*, *)]. PK1 corresponds to the leading key component 230 and thus is represented first in key space 420A by [100, 100] (i.e., the range is a single value of 100). If a given dimension of the key space 420 of an expression node 410 can include any value of its data type (e.g., integer), then it is represented by (*, *). For example, with respect to expression node 420A PK1=100, PK2 can take any value of its data type and thus is represented in key space 420A by (*, *), as shown. Similarly, with respect to expression node 420B PK2>25, PK1 can take any value of it data type and thus is represented in key space 420B by (*, *) while PK2 is represented by (25, *). The set of all keys 127 defined by a key space 420 can be generated by taking the cartesian product of the ranges (or the sets of distinct values) of the dimensions.

Although a key space 420 and a key range 149 represent a collection of keys 127, they are different in various embodiments. A key space 420 can map to a set of key ranges 149, and a key range 149 can map to a set of key spaces 420. One of the differences comes from the fact that the set of keys 127 in a key range 149 covers all the keys 127 between the boundary keys 127 of the key range 149, but a key space 420 may not cover all the keys 127.

Figure 4B:
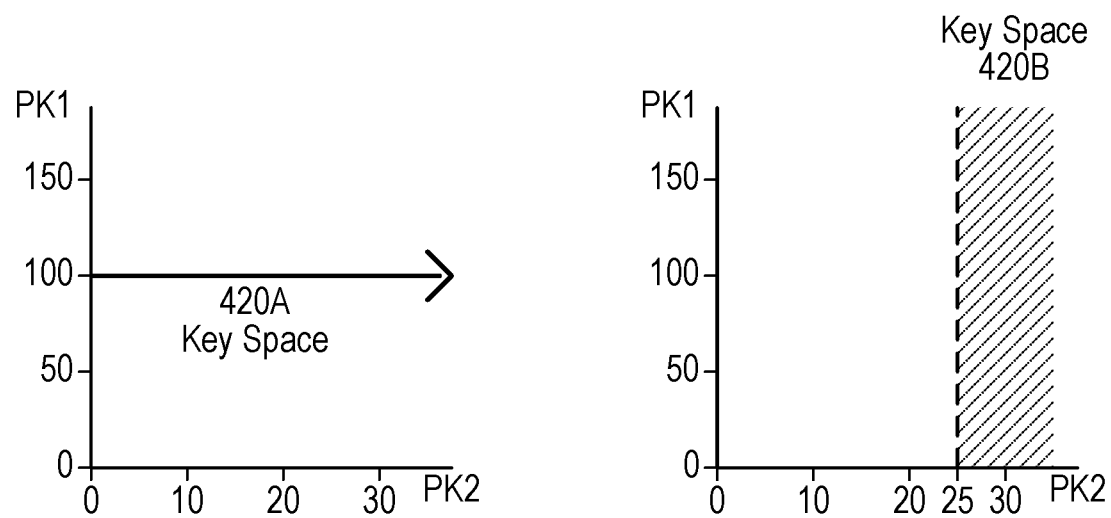

Turning now to FIG. 4B, graphical representations of key spaces 420A-B of FIG. 4A are shown. A key space 420 can be visualized as a geometric shape, where each side of that shape is defined by the ranges of two dimensions in a three-dimensional key space. Each side of the shape may be a point, a line, or a rectangle. For key space 420A, PK1 is one value (i.e., 100) and PK2 is the entire range of values of its data type. When depicted as a graphical shape, key space 420A is a line, as shown on the lefthand side of FIG. 4B. For key space 420B, PK1 is the entire range of values of its data type and PK2 is any value of its data type greater than 25. Consequently, when depicted, key space 420B is a rectangle, as shown on the righthand side of FIG. 4B. If the ranges for all dimensions are single valued (e.g., PK1=2 AND PK2=5 AND PK3=8), then the key space 420 is depicted as a point. While 2-dimensional shapes are depicted, a key space 420 can include more dimensions.

Figure 5A:
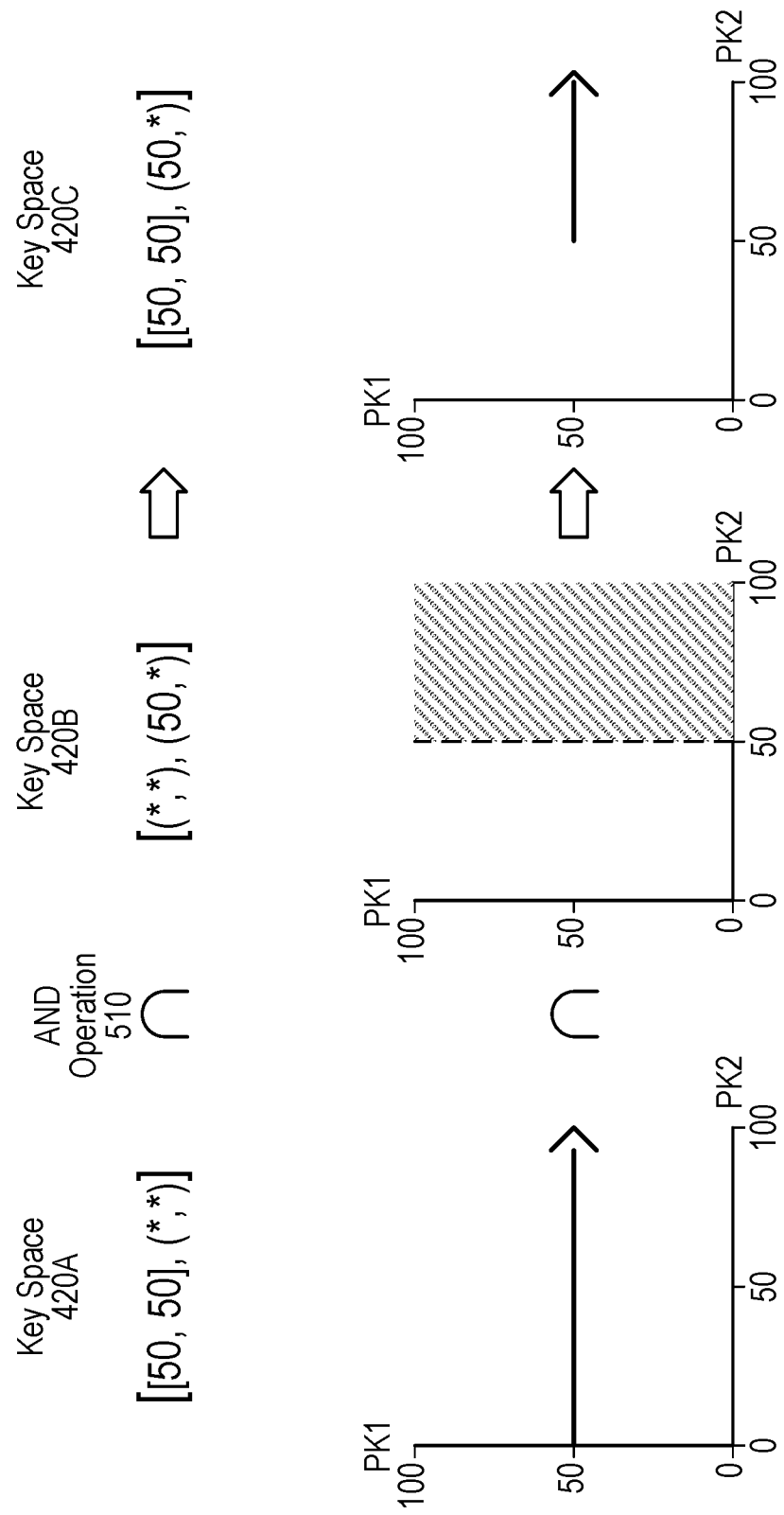
FIG. 5A is a block diagram that illustrates an example of an AND operation performed on two key spaces, according to some embodiments.

Turning now to FIG. 5A, a block diagram of an example AND operation 510 performed on two key spaces 420 is shown. In the illustrated embodiment, there are key spaces 420A-C and their corresponding graphical representations. As shown, key space 420A is [[50, 50], (*, *)], key space 420B is [(*, *), (50, *)], and key space 420C is [[50, 50], (50, *)]. Also as shown, AND operation 510 is performed on key spaces 420A-B to produce key space 420C. In some cases, the illustrated embodiment may be implemented differently.

AND operation 510, in various embodiments, is an intersection operation that involves taking the intersection of two key spaces 420. AND operation 510 results in a single key space 420, which might be an empty key space if there is no overlap between the two key spaces 420 of AND operation 510. The intersection of key spaces 420A-B is equivalent to the intersection of the ranges of the dimensions independently. As such, the intersection of the first dimension of key spaces 420A-B (i.e., [50, 50] and (*, *), respectively) is [50, 50], and the intersection of the second dimension (i.e., (*, *) and (50, *), respectively) is (50, *). Thus, the intersection of key spaces 420A-B results in key space 420C. As another example, key space 420 [(7,*), [3,*), (*,5)] AND key space 420 [(*. 7), (*,1), (4,7)] results in an empty key space 420. If a series of key spaces 420 are joined by a series of AND operations 510, then a rolling operation may be performed (i.e., take the AND of the first two key spaces 420 to produce a resulting key space 420, then take the AND of the resulting key space 420 and the next key space 420 to produce a resulting key space 420, and continue until all AND operations 510 of the series have been performed to produce a single key space 420, which can be a null space).

Figure 5B:
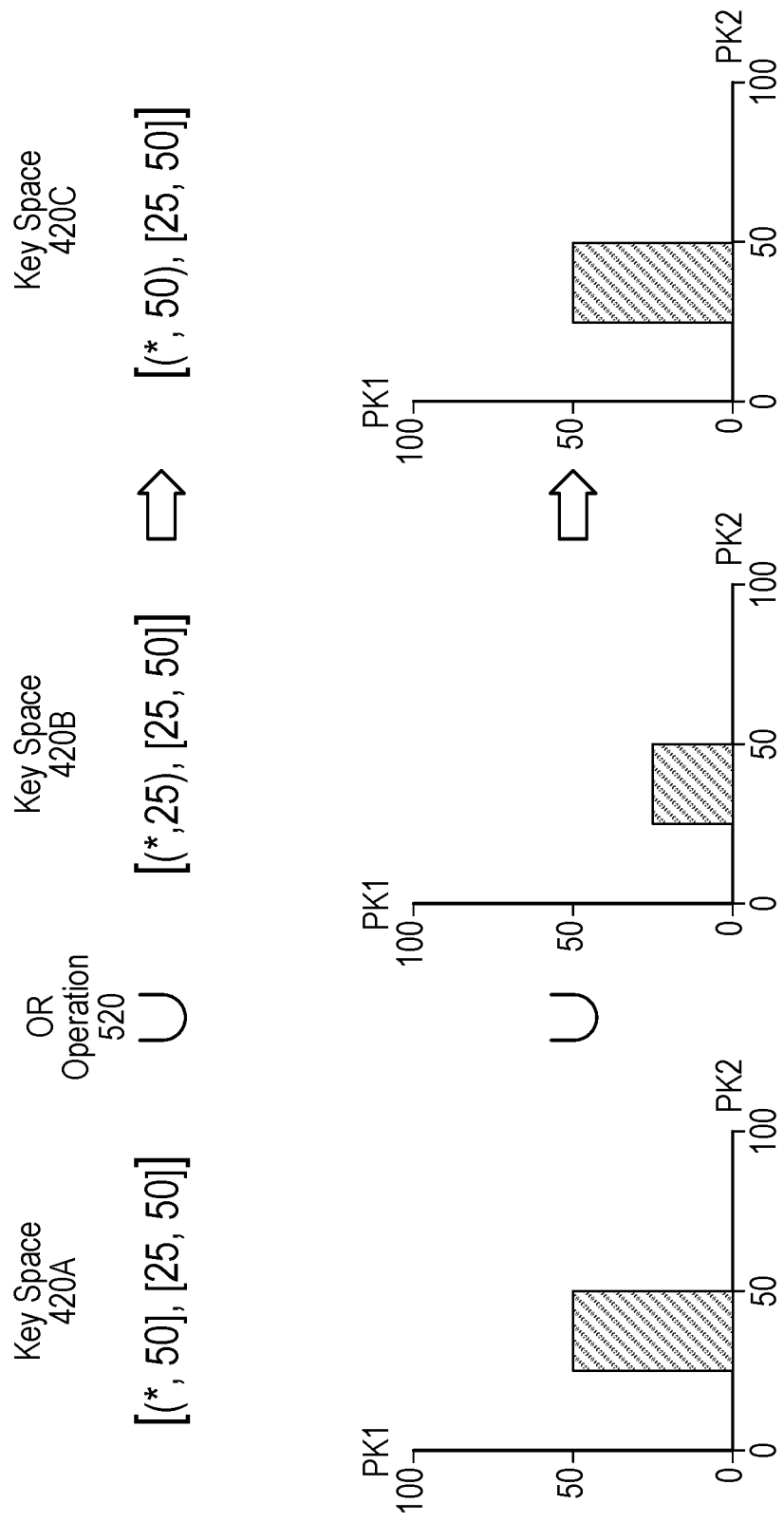
FIG. 5B is a block diagram that illustrates an example of an OR operation performed on two key spaces, according to some embodiments.

Turning now to FIG. 5B, a block diagram of an example OR operation 520 performed on two key spaces 420 is shown. In the illustrated embodiment, there are key spaces 420A-C and their corresponding graphical representations. As shown, key space 420A is [(*, 50], [25, 50]], key space 420B is [(*, 25), [25, 50]], and key space 420C is [(*, 50], [25, 50]]. As further shown, OR operation 520 is performed on key spaces 420A-B to produce key space 420C. In some cases, the illustrated embodiment may be implemented differently.

OR operation 520, in various embodiments, is a union operation that involves taking the union of two key spaces 420. OR operation 520 results in either the original two key spaces 420 (in this case, OR operation 520 is a no-op) or a single key space 420. Consider an example in which the union of two keys 127 of a table 120 is taken. If those keys 127 are consecutive, then the result is a key range 149 that includes both keys 127. But if the two keys 127 are not consecutive or the same, then the result will be two single-value key ranges 149 corresponding to those two keys 127, respectively.

In various embodiments, OR operation 520 results in a single key space 420 from two key spaces 420 having N dimensions if one of the following conditions is satisfied. If one key space 420 is completely contained within the other key space 420, then the result is the larger key space 420. This particular condition is illustrated in FIG. 5B. Key space 420B is contained within key space 420A and thus OR operation 520 results in key space 420C having the same ranges as key space 420A for their dimensions. If two key spaces 420 have the same range for at least N−1 dimensions and the ranges for the remaining dimension are not disjointed, then the result is a single key space 420 that is the union of the corresponding ranges of the two key spaces 420. For example, key space 420 [1, 1], [3, 7), (*, *)] OR key space 420 [1, 1], (6, 9), (*, *)] results in key space 420 [1,1], [3,9), (*,*)]. But key space 420 [(7, *), (*, 8), (4, 7)] OR key space 420 [(*, 7), (*, 8), (4, 7)] results in the list ([(7. *), [(*, 8), (4, 7)], [(*, 7), (*, 8), (4, 7)]) because the union of two ranges for the first dimension results in two ranges (*, 7) and (7, *) because they are disjointed. A series of OR operations 520 performed on N key spaces 420 can produce n key spaces 420, where n=1, 2, . . . , N. The number of resulting key spaces 420 is dependent on how many of those key spaces 420 can be merged.

Figure 6A:
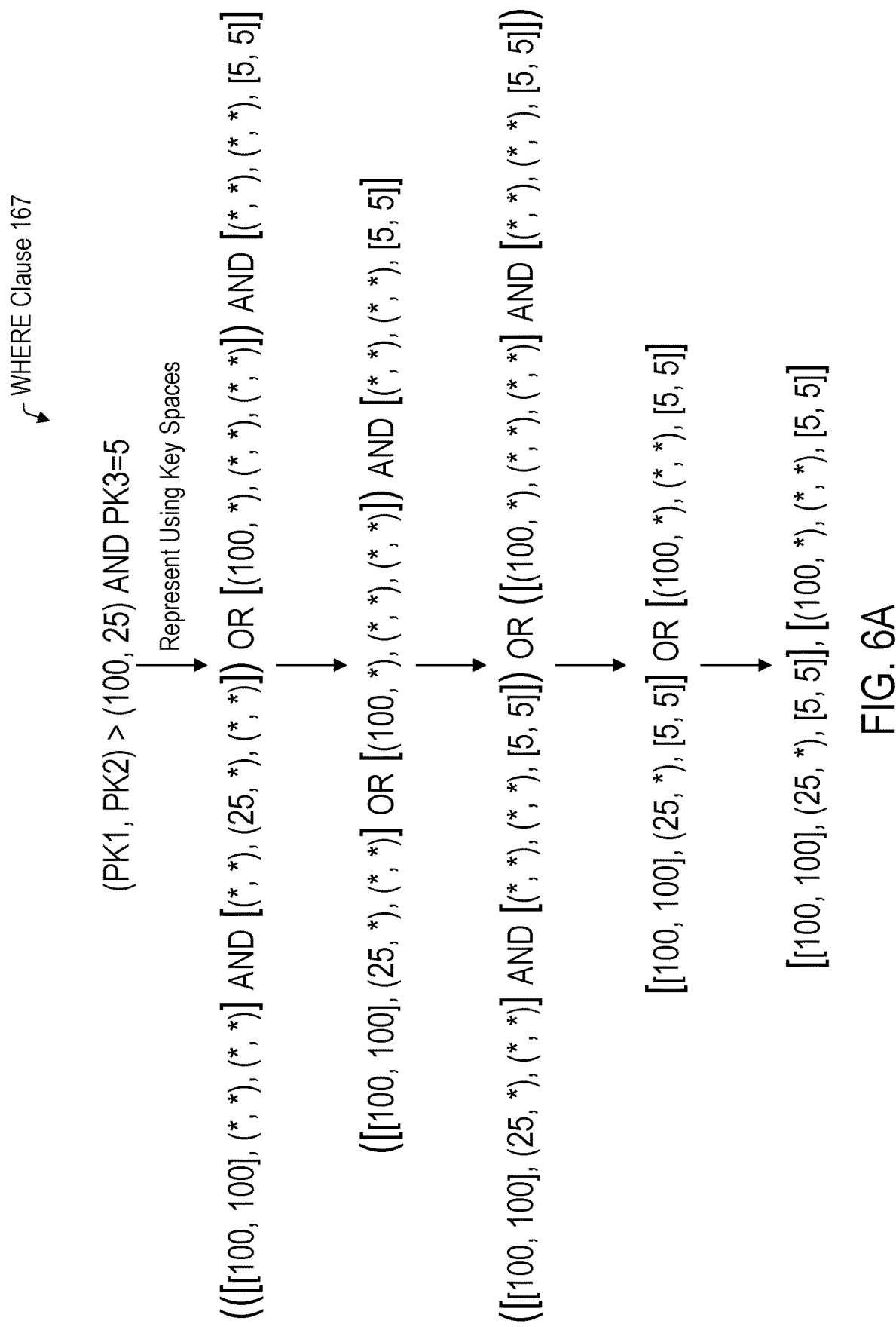
FIGS. 6A-B are block diagrams that illustrate an example of deriving key ranges from a WHERE clause, according to some embodiments.

Turning now to FIG. 6A, a block diagram of an example first part of deriving key ranges 149 from a WHERE clause 167 is shown. In the illustrated embodiment, WHERE clause 167 specifies (PK1, PK2)>(100, 25) AND PK3=5. As discussed, in various embodiments, key range module 147 initially converts the conditional expression(s) 240 of WHERE clause 167 into the equivalent AND/OR expression(s) 310. As shown, (PK1, PK2)>(100, 25) AND PK3=5 becomes ((([100, 100], (*, *), (*, *)] AND [(*, *), (25, *), (*, *)]) OR ([(100, *), (*, *), (*, *)])) AND [(*, *), (*. *), [5, 5]]. The result can be considered an expression tree having key spaces 420 [100, 100], (*. *), (*. *)] and [(*, *), (25, *), (*, *)] as leaf nodes that are connected by an AND operation 510. The result of that AND operation 510 is connected to a node having key space 420 ([(100, *), (*, *), (*. *)] via an OR operation 520. The result of that OR operation is connected to a node having key space 420 [(*, *), (*, *). [5, 5]] via an AND operation 510. In various embodiments, key range module 147 performs the logical operations (e.g., AND/OR operations 510/520) according to the expression tree. Accordingly, ([[100, 100], (*. *), (*. *)] AND [(*, *), (25, *), (*. *)]) becomes [[100, 100], (25, *), (*, *)].

In some cases, it may be desirable to distribute an AND operation 510 over a set of OR operations 520, which means taking the AND of every pair of key spaces 420 involved in the particular ORs and then taking the ORs of the results of the ANDs. For example, (A OR B) AND (C OR D) becomes (A AND C) OR (A AND D) OR (B AND C) OR (B AND D). Accordingly, ([[100, 100], (25, *), (*. *)] OR [(100. *). (*, *), (*, *)]) AND [(*, *), (*, *), [5, 5]] becomes ([[100, 100], (25, *), (*. *)] AND [(*, *), (*, *), [5, 5]]) OR ([(100, *), (*, *), (*, *)] AND [(*, *), (*. *), [5, 5]]). Performing the AND and OR operations 510 and 520 of the latter expression produces to two key spaces 420: [[100, 100], (25, *), [5, 5]] and [(100, *), (*, *), [5, 5]]. Key range module 147 may then convert those key spaces 420 into key ranges 149 as discussed in greater detail with respect to FIG. 6B.

Figure 6B:
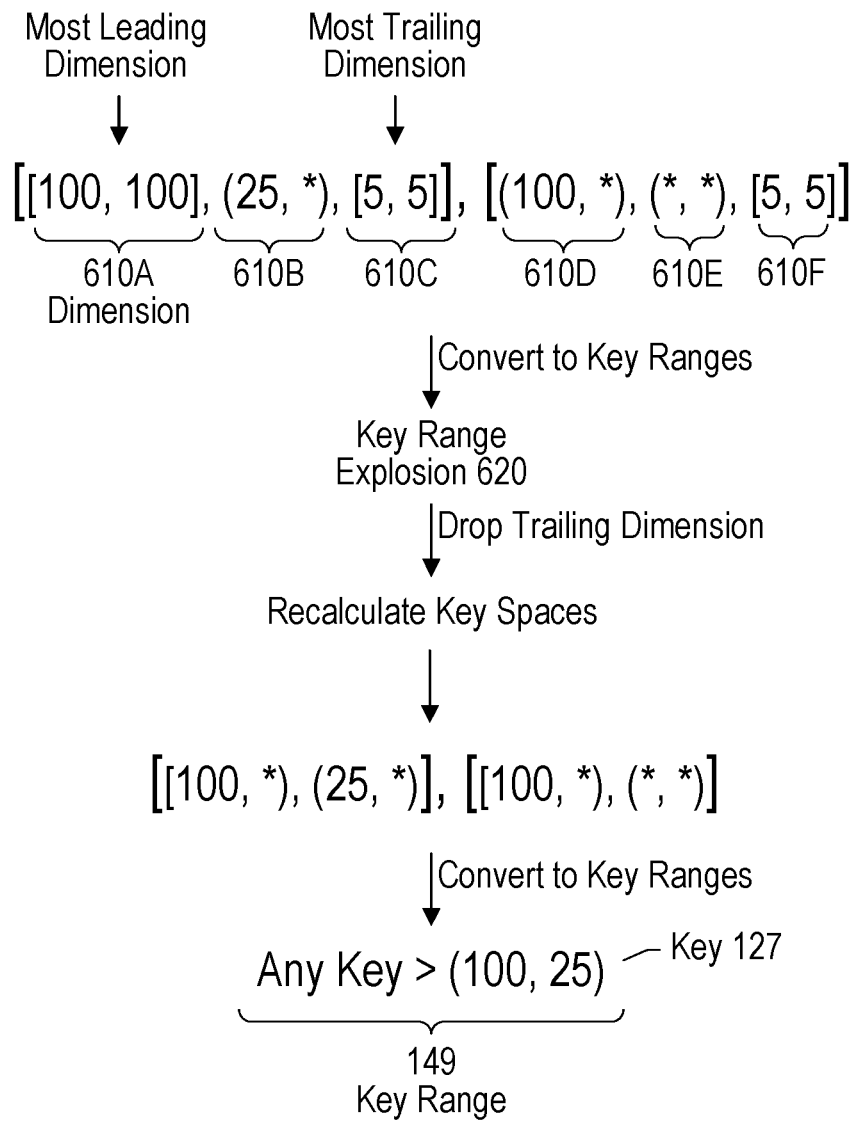

Turning now to FIG. 6B, a block diagram is shown that continues the example depicted in FIG. 6A. In various embodiments, the set of key ranges 149 for a key space 420 is determined using the ranges of leading dimensions 610. A dimension 610 corresponds to a key component 230 used to form a key 127. The most leading dimension 610 corresponds to the most leading key component 230 that is involved in a WHERE clause 167, and the most trailing dimension 610 corresponds to the most trailing key component 230 that is involved in that WHERE clause 167. Consider an example in which a key 127 is formed and ordered as (PK1, PK2, PK3). In the case of a WHERE clause 167 involving, e.g., PK1 and PK2, PK1 is the leading dimension 610 and PK2 is the trailing dimension 610.

A dimension 610 whose range covers all values of its key component's data type (i.e., the range is (*, *)) is referred to herein as an "everything dimension." The trailing dimensions 610 starting with the first leading everything dimension 610 are not considered for generating key ranges 149, in various embodiments. That is, the set of key ranges 149 for a key space 420 is determined using the leading non-everything dimensions 610. Thus, as an example, for the illustrated key space 420 [100, *), (*, *), [5, 5]], only the range of dimension 610D (which is the most leading dimension 610 of that key space 420) is considered as dimension 610E is the first everything dimension and dimension 610F trails the first everything dimension. If the first dimension 610 of a key space 420 is an everything dimension, then the set of key ranges 149 for that key space 420 includes all keys 127.

Let $d_1, d_2, \ldots, d_m$ be the sequence of the leading non-everything dimensions 610 of a key space 420. The number of key ranges 149 included in the key space 420 can be determined by all dimensions 610 except the last dimension in this sequence, i.e., $d_m$. Let $n_1, n_2, \ldots n_{m-1}$ be the number of distinct values in the ranges of those dimensions 610, respectively. The number of key ranges 149 can be calculated by $n_1 * n_2 * \ldots * n_{m-1}$. In various embodiments, key range module 147 calculates the number of key ranges 149 for a key space 420 in order to determine whether a key range explosion 620 will happen when converting that key space 420 into a set of key ranges 149. A key range explosion 620, in various embodiments, is defined as occurring when the number of key ranges 149 that are/will be generated exceeds a specified threshold or the amount of resources (e.g., memory, CPU usage, etc.) will exceed a specified threshold. For example, the illustrated key space 420 [[100, 100], (25, *), [5, 5]] might involve generating too many key ranges 149 according to a predefined threshold. To avoid a key range explosion 620, in various embodiments, key range module 147 drops trailing dimensions 610 until a key range explosion 620 is prevented. The threshold used in detecting a key range explosion 620 may be such that the time and space complexity involved in the conversion process of a key space 420 is bounded by $O(N^2)$. In the illustrated embodiment, a key range explosion 620 is detected. As a result, the most trailing dimension 610 of both key spaces 420 is dropped. In some cases, the most trailing dimension 610 is dropped for one key space 420 while in other cases, it is dropped for all key spaces 420. In various embodiments, key range module 147 can decide at what level of granularity (i.e., at what level of dimensionality) that the key ranges 149 should be expressed during the generation of the expression tree.

In various embodiments, when a key range explosion 620 is detected and one or more of the most trailing dimensions 610 are dropped, database node 130 recalculates the key spaces 420 using the approach described with respect to FIG. 6A. Accordingly, ((([[100, 100], (*. *)] AND [(*. *), (25, *)]) OR [(100, *), (*, *)]) AND [(*, *), (*, *)]=([[100, 100]. (25, *)] OR [(100, *), (*, *)]) AND [(*. *), (*, *)]=([[100, 100], (25, *)] AND [(*, *), (*, *)]) OR ([(100, *), (*, *)] AND [(*. *), (*. *)])=[[100, 100], (25, *)] OR [(100,*), (*, *)]=[[100, *), (25, *)], [(100,*), (*, *)].

To derive the set of key ranges 149 for a given key space 420, in various embodiments, key range module 147 initially generates key prefixes based on the first m−1 dimensions 610 (i.e., the leading non-everything dimensions 610 expect the last one, as discussed above). The key prefixes are generated by taking the cartesian product of the ranges of the m−1 dimensions 610. In various embodiments, the key prefixes are then concatenated with the range of the last dimension (i.e., $d_m$) to produce the set of key ranges 149 for the given key space 420. Let p be a key prefix (for the first m−1 dimensions) and r be the range (for $d_m$). If the lower bound for r is unbounded, then the key range 149 will be (*, p.u] and if the upper bound for r is *, then the key range 149 will be [p.l, *), otherwise the key range 149 will be [p.l. p.u], where l and u are inclusive lower and upper values for r. If there is only one non-everything dimension 610, then the range for that dimension 610 is the key range 149 for the key space 420. As shown, when the illustrated key spaces 420 are converted into a set of key ranges 149 (after their most trailing dimension 610 is dropped (i.e., dimension 610C and 610F), the result is a single key range 149 (Any Key>(100, 25)) where (100, 25) is a key 127. In some cases, after converting key spaces 420 into key ranges 149, there may be some key ranges 149 that can still merge. Accordingly, key range module 147 may sort the key ranges 149 and then merge the adjacent or overlapping key ranges 149

Figure 7:
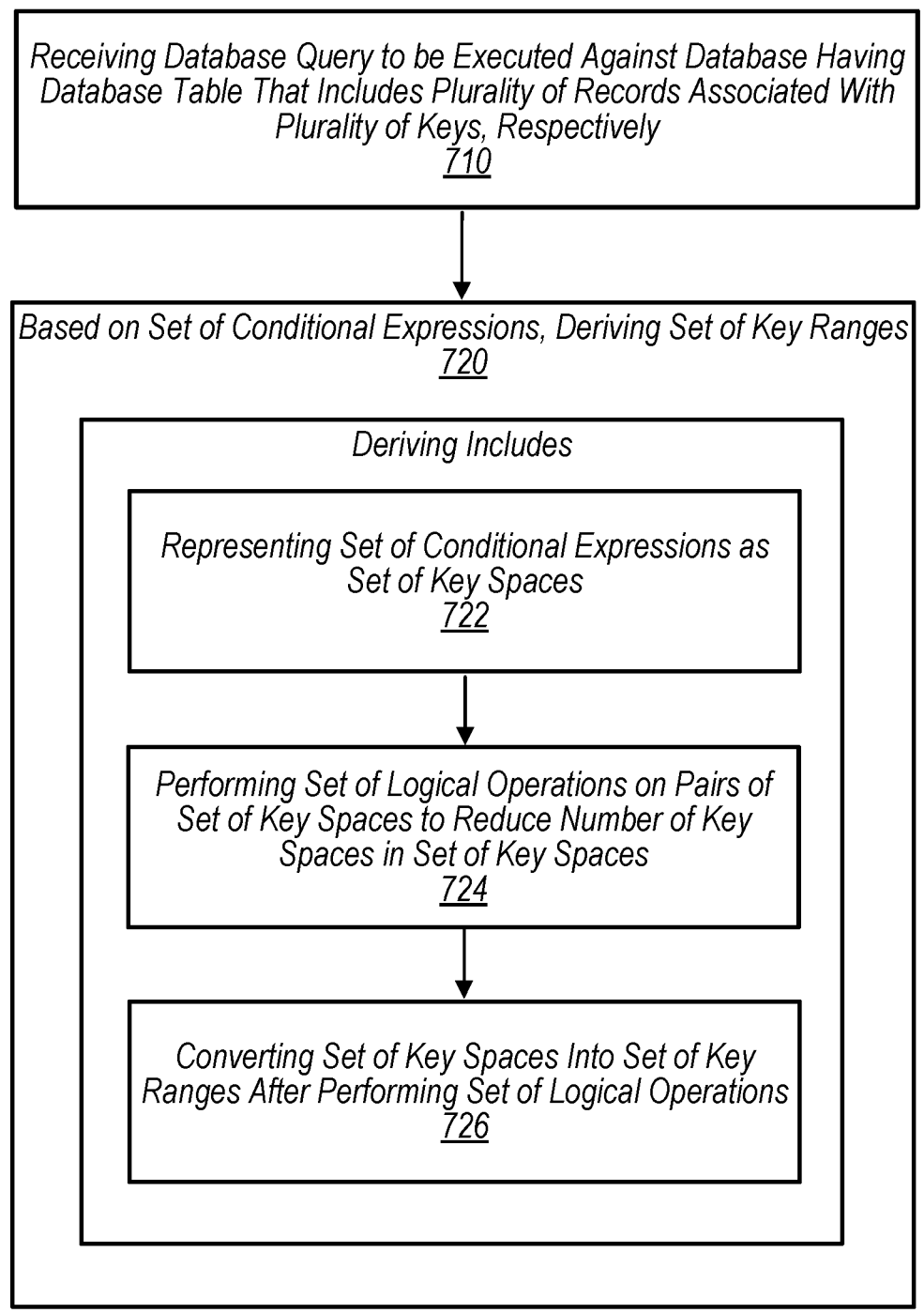
FIG. 7 is a flow diagram illustrating an example method relating to deriving key ranges for a database query, according to some embodiments.

Turning now to FIG. 7, a flow diagram of a method 700 is shown. Method 700 is one embodiment of a method performed by a computer system (e.g., system 100) to derive a set of key ranges (e.g., a set of key ranges 149) that can be used in processing a database query (e.g., a database statement 165). Method 700 may be performed by executing program instructions stored on a non-transitory computer-readable medium. In some embodiments, method 700 can include more or less steps than shown. For example, method 700 may include a step in which the computer system executes the database query according to a query plan having the set of key ranges.

Method 700 begins in step 710 with the computer system receiving a database query to be executed against a database (e.g., database store 110) having a database table (e.g., table 120) that includes a plurality of records (e.g., records 125) associated with a plurality of keys (e.g., keys 127), respectively. The database query may specify a set of conditional expressions (e.g., a set of conditional expressions 240) that affect which ones of the plurality of records are returned. In various embodiments, the plurality of keys are primary keys, a given one of which is derived from a set of values of a record that corresponds to a set of columns (e.g., columns 210) designated as primary key columns.

In step 720, based on the set of conditional expressions, the computer system derives the set of key ranges. As a part of the deriving, in step 722, the computer system represents the set of conditional expressions as a set of key spaces (e.g., key spaces 420). A particular one of the key spaces encompasses ones of the plurality of keys that satisfy a particular one of the set of conditional expressions. The set of conditional expressions can include an IN expression (e.g., conditional expressions 240C) that is converted into at least one OR operation involving a pair of the set of key spaces. The set of conditional expressions can include a BETWEEN expression (e.g., conditional expressions 240B) that is converted into an AND operation that involves a pair of the set of key spaces.

In some embodiments, the particular key space defines, for a given one of one or more of the set of columns, a range of values that can be taken by a key for the given column with respective to the particular conditional expression. As an example, the range of values for the key space 420 of the conditional expression 240 (PK>5) is [(5,*)] where PK corresponds to an integer column. The dimensionality of a given one of the set of key spaces corresponds to the number of primary key column components (e.g., key components 230) involved in the set of conditional expressions.

As a part of the deriving, in step 724, the computer system performs a set of logical operations on pairs of the set of key spaces to reduce a number of key spaces in the set of key spaces. One of the set of logical operations may be an AND operation (e.g., an AND operation 510) that involves performing an intersection operation between a pair of the set of key spaces. One of the set of logical operations may be an OR operation (e.g., an OR operation 520) that involves performing a union operation between a pair of the set of key spaces.

As a part of the deriving, in step 726, the computer system converts the set of key spaces into the set of key ranges after performing the set of logical operations. In some cases, the computer system detects that a key range explosion (e.g., a key range explosion 620) will occur when converting the set of key spaces. In response, the computer system may lower a dimensionality (e.g., drop a trailing dimension 610) of all key spaces of the set of key spaces to prevent the key range explosion. The key range explosion may be defined as occurring when a conversion of a key space generates at least a threshold number of key ranges or will consume a threshold amount of resources. In various embodiments, the converting includes deriving, for the particular key space, a set of key prefixes based on a subset of the set of dimensions of the particular key space and generating one or more key ranges based on the set of key prefixes and one of the set of dimensions that is not included in the subset of dimensions.

Exemplary Computer System

Figure 8:
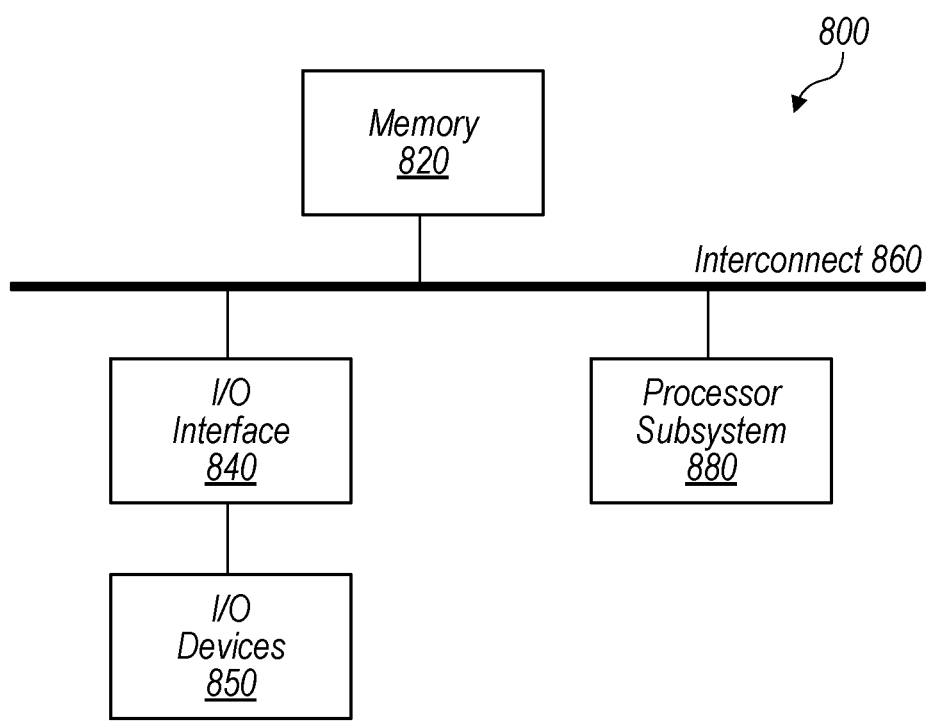
FIG. 8 is a block diagram illustrating elements of a computer system for implementing various systems described in the present disclosure, according to some embodiments.

Turning now to FIG. 8, a block diagram of an exemplary computer system 800, which may implement system 100, database store 110, and/or database node 130, is shown. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement query planning engine 140 and/or query execution engine 150 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method for deriving a set of key ranges to be used in processing a database query, the method comprising:
    receiving, by a computer system, the database query to execute against a database having a database table that includes a plurality of records associated with a plurality of keys, respectively, the database query specifying a set of conditional expressions that affect which ones of the plurality of records are returned, wherein the set of conditional expressions includes an IN expression;
    based on the set of conditional expressions, deriving, by the computer system, the set of key ranges by:
        representing the set of conditional expressions as a set of key spaces, wherein a particular key space encompasses ones of the plurality of keys that satisfy a particular one of the set of conditional expressions, wherein the representing includes converting the IN expression into at least one OR operation involving a pair of the set of key spaces;
        performing a set of logical operations on pairs of the set of key spaces to reduce a number of key spaces in the set of key spaces; and
        converting the set of key spaces into the set of key ranges after performing the set of logical operations; and
    executing, by the computer system, the database query according to a query plan having the set of key ranges.

2. The method of claim 1, wherein a dimensionality of a given one of the set of key spaces corresponds to a number of primary key columns involved in the set of conditional expressions.

3. The method of claim 2, wherein the deriving includes:
    detecting a key range explosion for converting the set of key spaces; and
    lowering the dimensionality of the given key space to prevent the key range explosion from occurring.

4. The method of claim 3, wherein the key range explosion is defined as occurring when a conversion of a key space generates at least a threshold number of key ranges.

5. The method of claim 1, wherein one of the set of logical operations is an AND operation that involves performing an intersection operation between a pair of the set of key spaces.

6. The method of claim 1, wherein one of the set of logical operations is an OR operation that involves performing a union operation between a pair of the set of key spaces.

7. The method of claim 1, wherein the plurality of keys are primary keys, a given one of which is derived from a set of values of a record that corresponds to a set of columns designated as primary key columns.

8. The method of claim 7, wherein the particular key space defines, for a given one of one or more of the set of columns, a range of values that are permitted for a key of the given column with respective to the particular conditional expression.

9. The method of claim 1, wherein the particular key space comprises a set of dimensions, and wherein the converting includes:
    deriving, for the particular key space, a set of key prefixes based on a subset of the set of dimensions of the particular key space; and
    generating one or more key ranges based on the set of key prefixes and one of the set of dimensions that is not included in the subset of dimensions.

10. A non-transitory computer readable medium having program instructions stored thereon that are executable by a computer system to cause the computer system to perform operations comprising:
    receiving a database query to execute against a database having a database table that includes a plurality of records associated with a plurality of keys, respectively, wherein the database query specifies a set of conditional expressions that affect which ones of the plurality of records are returned, wherein the set of conditional expressions includes a BETWEEN expression;
    based on the set of conditional expressions, deriving the set of key ranges by:
        representing the set of conditional expressions as a set of key spaces, wherein the representing includes converting the BETWEEN expression into an AND operation involving a pair of the set of key spaces;
        performing a set of logical operations on pairs of the set of key spaces to reduce a number of key spaces in the set of key spaces; and converting the set of key spaces into the set of key ranges after performing the set of logical operations; and executing the database query according to a query plan having the set of key ranges.

11. The non-transitory computer readable medium of claim 10, wherein the set of conditional expressions includes an IN expression, and wherein the representing includes:
converting the IN expression into at least one OR operation involving a pair of the set of key spaces.

12. The non-transitory computer readable medium of claim 10, wherein the deriving includes:
determining that converting a particular one of the set of key spaces will result in a key range explosion; and
lowering a dimensionality of all key spaces of the set of key spaces to prevent the key range explosion when converting the particular key space into one or more key ranges.

13. The non-transitory computer readable medium of claim 10, wherein the converting of the set of key spaces into the set of key ranges includes:
deriving, for a given one of the set of key spaces, a set of key prefixes based on a subset of a set of dimensions of the given key space; and
generating one or more key ranges based on the set of key prefixes and one of the set of dimensions that is not included in the subset of dimensions.

14. The non-transitory computer readable medium of claim 10, wherein a particular one of the set of key spaces defines, for a given one of a plurality of dimensions of the particular key space, a range of values for the given dimension with respect to a particular one of the set of conditional expressions.

15. A system, comprising:
at least one processor; and
memory having program instructions stored thereon that are executable by the at least one processor to cause the system to perform operations comprising:
receiving a database query to execute against a database having a database table that includes a plurality of records associated with a plurality of keys, respectively, wherein the database query specifies a set of conditional expressions that affect which ones of the plurality of records are returned;
based on the set of conditional expressions, deriving the set of key ranges by:
representing the set of conditional expressions as a set of key spaces;
performing a set of logical operations on pairs of the set of key spaces to reduce a number of key spaces in the set of key spaces; and
converting the set of key spaces into the set of key ranges after performing the set of logical operations, wherein the converting of the set of key spaces into the set of key ranges includes:
deriving, for a given one of the set of key spaces, a set of key prefixes based on a subset of a set of dimensions of the given key space; and
generating one or more key ranges based on the set of key prefixes and one of the set of dimensions that is not included in the subset of dimensions; and
executing the database query according to a query plan having the set of key ranges.

16. The system of claim 15, wherein the set of conditional expressions includes a BETWEEN expression, and wherein the representing includes:
converting the BETWEEN expression into an AND operation involving a pair of the set of key spaces.

17. The system of claim 15, wherein the deriving of the set of key ranges includes:
determining that the converting will result in a key range explosion; and
lowering a dimensionality of all key spaces of the set of key spaces to prevent the key range explosion.

18. The system of claim 15, wherein the set of logical operations include:
an OR operation that involves performing a union operation of a first pair of the set of key spaces; and
an AND operation that involves performing an intersection operation of a second pair of the set of key spaces.

* * * * *